United States Patent
Kutej et al.

(10) Patent No.: US 11,269,067 B2
(45) Date of Patent: Mar. 8, 2022

(54) RESPONSE-BASED DETERMINATION OF PIEZOELECTRIC TRANSDUCER STATE

(71) Applicant: SEMICONDUCTOR COMPONENTS INDUSTRIES, LLC, Phoenix, AZ (US)

(72) Inventors: Jiri Kutej, Brno (CZ); Tomas Suchy, Brno (CZ); Marek Hustava, Bratislava (SK); Pavel Horsky, Brno (CZ); Zdenek Axman, Sebetov (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 936 days.

(21) Appl. No.: 15/888,543

(22) Filed: Feb. 5, 2018

(65) Prior Publication Data

US 2019/0079173 A1 Mar. 14, 2019

Related U.S. Application Data

(60) Provisional application No. 62/557,593, filed on Sep. 12, 2017.

(51) Int. Cl.
  *G01S 7/52* (2006.01)
  *B06B 1/02* (2006.01)
  (Continued)

(52) U.S. Cl.
  CPC ........ *G01S 7/52004* (2013.01); *B06B 1/0215* (2013.01); *G01H 11/08* (2013.01);
  (Continued)

(58) Field of Classification Search
  CPC .... G01S 7/52004; G01S 15/931; G01S 7/523; G01S 15/93; B06B 1/0215;
  (Continued)

(56) References Cited

U.S. PATENT DOCUMENTS 5,511,041 A 4/1996 Michalski
6,035,696 A * 3/2000 Kiefer ............... G01H 13/00
702/97

(Continued)

OTHER PUBLICATIONS

English machine translation for JP2017-011456.*

*Primary Examiner* — Peter J Macchiarolo
*Assistant Examiner* — Anthony W Megna Fuentes
(74) *Attorney, Agent, or Firm* — Ramey & Schwaller, LLP

(57) ABSTRACT

Piezoelectric sensor controllers may facilitate detection and identification of various potential fault states with parameter measurements. In an illustrative embodiment of a piezoelectric-based sensor having response-parameter-based fault diagnosis, the sensor includes a piezoelectric transducer and a controller. The controller drives the piezoelectric transducer to generate bursts of acoustic energy and, based on a response of the piezoelectric transducer to said driving, identifies a corresponding transducer state from a set of potential states including multiple transducer fault states. An illustrative embodiment of a sensing method having fault diagnosis, the method includes: driving a piezoelectric transducer to generate a burst of acoustic energy; monitoring a response of the piezoelectric transducer to said driving; identifying, based on said response, a corresponding transducer state from a set of potential states including multiple transducer fault states; and if the transducer state is a fault state, reporting that fault state.

20 Claims, 6 Drawing Sheets

(51) Int. Cl.
*G01H 13/00* (2006.01)
*G01H 11/08* (2006.01)
*G01S 15/931* (2020.01)
*G01S 15/93* (2020.01)
*G01S 7/523* (2006.01)

(52) U.S. Cl.
CPC .......... *G01H 13/00* (2013.01); *B06B 2201/40* (2013.01); *B06B 2201/55* (2013.01); *G01S 15/931* (2013.01)

(58) Field of Classification Search
CPC .. B06B 2201/40; B06B 2201/55; G01H 7/00; G01H 13/00; G01H 15/00; G01N 29/42; G01N 29/36
See application file for complete search history.

(56) References Cited

U.S. PATENT DOCUMENTS

| | | |
|---|---|---|
| 7,248,153 B2 | 7/2007 | Danz et al. |
| 7,385,487 B2 | 6/2008 | Simonazzi |
| 8,699,299 B2 | 4/2014 | Horsky et al. |
| 9,810,778 B2 | 11/2017 | Koudar et al. |
| 2007/0034009 A1* | 2/2007 | Pado ..................... G01N 29/42 73/579 |
| 2014/0300504 A1 | 10/2014 | Shaffer et al. |
| 2016/0061652 A1* | 3/2016 | Zhang ..................... G01H 13/00 73/1.82 |
| 2019/0337015 A1* | 11/2019 | Nakao ..................... H04R 3/00 |
| 2019/0339370 A1* | 11/2019 | Watanabe ............... G01S 7/521 |

\* cited by examiner

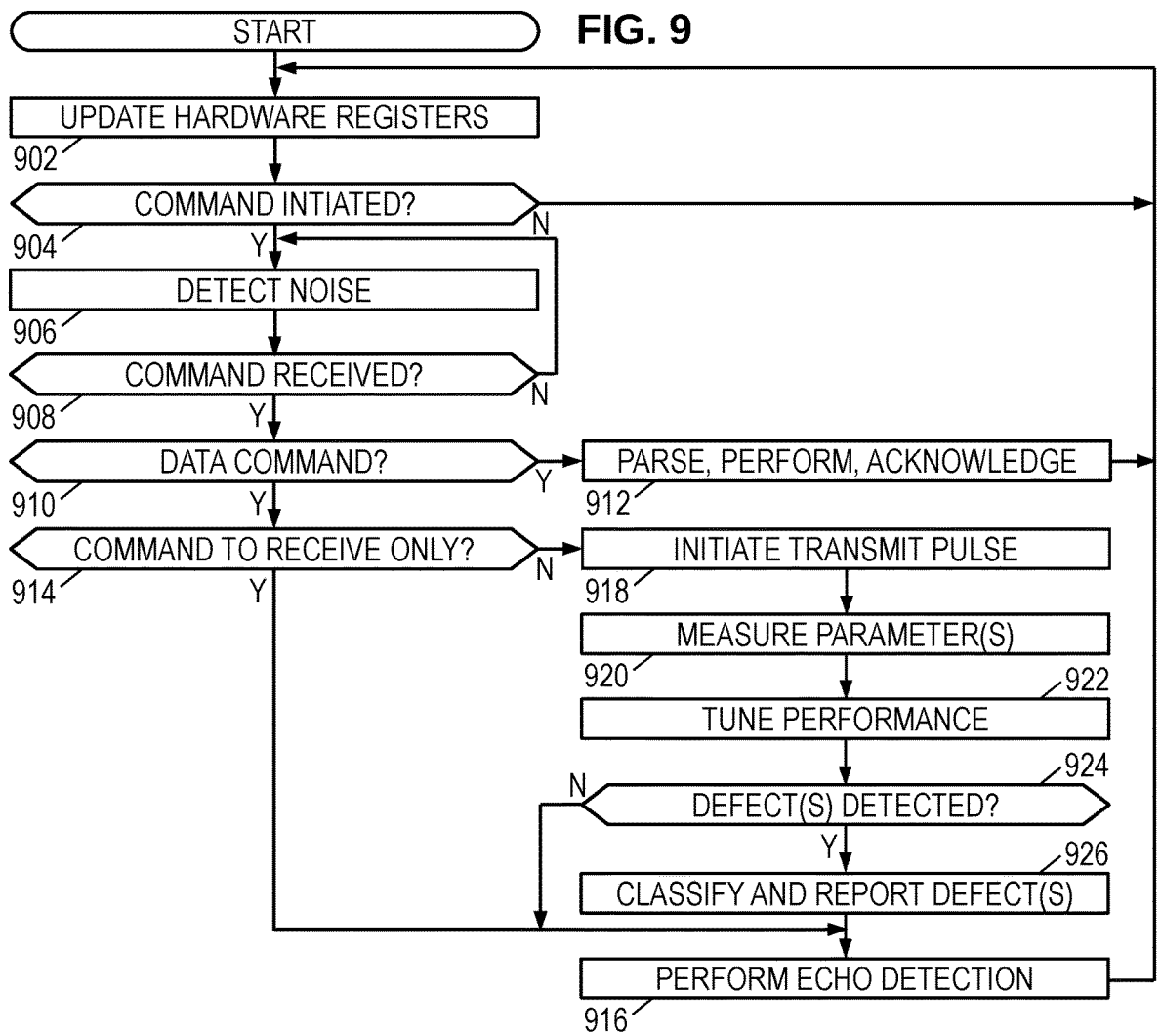

RESPONSE-BASED DETERMINATION OF PIEZOELECTRIC TRANSDUCER STATE

CROSS-REFERENCE TO RELATED APPLICATIONS

The present application claims priority to Provisional U.S. Application 62/557,593, titled "Diagnostic methods and measurement of ultrasonic sensor parameters" and filed 2017 Sep. 12 by inventors Jiri Kutej, Tomas Suchy, Marek Hustava, Pavel Horsky, and Zdenek Axman. This provisional application is hereby incorporated herein by reference.

The present application relates to commonly-owned U.S. patent application Ser. No. 15/888,596, titled "Measuring resonance parameters of piezoelectric transducers" and filed concurrently herewith by inventors Jiri Kutej, Tomas Suchy, Marek Hustava, Pavel Horsky, and Zdenek Axman. This commonly-owned application is hereby incorporated herein by reference.

BACKGROUND

Modern automobiles are equipped with an impressive number and variety of sensors. For example, cars are now routinely equipped with arrays of ultrasonic sensors to monitor the distance between the car and any nearby persons, pets, vehicles, or obstacles. Due to environmental "noise" and safety concerns, each of the sensors may be asked to provide tens of measurements each second while the car is in motion. It is important for such sensor arrays to perform reliably or to alert the operator when their performance is suspect.

As the number of sensors increases, so too does the incidence rate of sensor failures and the importance of correctly diagnosing such failures so that the operator can be alerted and, if needed, suitable action can be taken to correct or accommodate the failure. Illustrative actions may include: repairing a broken or disconnected transducer, washing the car to remove mud or dirt from the sensor's surface, exercising caution while the transducer is impaired by snow or rain, and just ignoring a transient noise event when the sensor is otherwise operating correctly. Because existing sensors are unable to correctly diagnose such failures, they are unable to suitably alert the operator to the appropriate action, forcing the system to make a choice between requiring a potentially unnecessary visit to a repair shop or leaving the operator ignorant of a correctable condition impairing operation of the sensors.

SUMMARY

Accordingly, there are disclosed herein various sensors, sensor controllers, and sensor control methods with novel parameter measurements which may facilitate detection and identification of various potential fault states. In an illustrative embodiment of a piezoelectric-based sensor having fault diagnosis, the sensor includes a piezoelectric transducer and a controller. The controller drives the piezoelectric transducer to generate bursts of acoustic energy and, based on a response of the piezoelectric transducer to said driving, identifies a corresponding transducer state from a set of potential states including multiple transducer fault states. An illustrative embodiment of a sensing method having fault diagnosis, the method includes: driving a piezoelectric transducer to generate a burst of acoustic energy; monitoring a response of the piezoelectric transducer to said driving; identifying, based on said response, a corresponding transducer state from a set of potential states including multiple transducer fault states; and if the transducer state is a fault state, reporting that fault state.

In an illustrative embodiment of a piezoelectric-based sensor having a shorted-reverberation based resonant frequency measurement, the sensor includes a piezoelectric transducer that provides residual reverberation after being driven. The sensor further includes a controller that provides a low impedance path for the piezoelectric transducer during the residual reverberation and that measures current through the low impedance path to determine a resonant frequency of the piezoelectric transducer. In an illustrative embodiment of a sensing method having a shorted-reverberation based resonant frequency measurement, the method includes: driving a piezoelectric transducer that provides residual reverberation after being driven; providing a low impedance path for the piezoelectric transducer during the residual reverberation; and measuring current through the low impedance path to determine a resonant frequency of the piezoelectric transducer.

In an illustrative embodiment of a piezoelectric-based sensor having a shorted-reverberation based quality factor measurement, the sensor includes a piezoelectric transducer that provides residual reverberation after being driven. The sensor further includes a controller that provides a low impedance path for the piezoelectric transducer during the residual reverberation and that measures current through the low impedance path to determine a quality factor Q of the piezoelectric transducer. In an illustrative embodiment of a sensing method having a shorter-reverberation based quality factor measurement, the method includes: driving a piezoelectric transducer that provides residual reverberation after being driven; providing a low impedance path for the piezoelectric transducer during the residual reverberation; and measuring current through the low impedance path to determine a generated acoustic pressure of the piezoelectric transducer.

In an illustrative embodiment of a sensor having a response-based measurement of quality factor, the sensor includes a piezoelectric transducer and a controller. The controller drives the piezoelectric transducer to generate bursts of acoustic energy and, based on a response of the piezoelectric transducer to said driving, derives a quality factor. In an illustrative embodiment of a sensing method having a response-based measurement of quality factor, the method includes: driving a piezoelectric transducer to generate a burst of acoustic energy; and deriving a quality factor from a response of the piezoelectric transducer to said driving.

In an illustrative embodiment of a sensor having phase-based measurement of resonant frequency, the sensor includes a piezoelectric transducer and a controller. The controller drives the piezoelectric transducer to generate bursts of acoustic energy and compares phases of driving current and voltage to determine a resonant frequency of the piezoelectric transducer. In an illustrative embodiment of a sensing method having phase-based measurement of resonant frequency, the method includes: driving a piezoelectric transducer to generate a burst of acoustic energy; and comparing phases of driving voltage and current to determine a resonant frequency of the piezoelectric transducer.

In an illustrative embodiment of a sensor having reverberation-based measurement of multiple parameters, the sensor includes a piezoelectric transducer that provides residual reverberation after being driven. The sensor further includes a controller that measures the residual reverberation to determine multiple parameters from a parameter set consisting of resonant frequency, quality factor, and series resistance. In an illustrative embodiment of a sensing method having reverberation-based measurement of multiple parameters, the method includes: driving a piezoelectric transducer that provides residual reverberation after being driven; and measuring the residual reverberation to determine multiple parameters from a parameter set consisting of resonant frequency, quality factor, and series resistance.

Each of the foregoing embodiments may be employed individually or conjointly, and (as reflected by the claims) they may further employ one or more of the following optional features in any suitable combination: 1. the set of potential states includes: normal, loaded, impeded, and defective. 2. said identifying includes deriving a resonant frequency from the response. 3. said deriving includes measuring the resonant frequency during a reverberation stage of the response. 4. said deriving includes shorting the piezoelectric transducer while measuring the resonant frequency. 5. said measuring occurs during a driving stage of the response. 6. said measuring includes comparing phases of current and voltage supplied to the piezoelectric transducer. 7. said measuring includes measuring the frequency dependence of the response. 8. said identifying includes deriving a quality factor (Q) from the response. 9. said deriving includes measuring the quality factor during a reverberation stage of the response. 10. said deriving includes shorting the piezoelectric transducer while measuring the quality factor. 11. said deriving includes measuring the quality factor during a driving stage of the response. 12. said identifying includes deriving an impedance of the piezoelectric transducer from the response. 13. said identifying includes deriving at least two parameters of the piezoelectric transducer from the response. 14. the controller identifying, based at least in part on the resonant frequency, a transducer state from a set of potential states including multiple transducer fault states. 15. the controller determining a quality factor or impedance of the piezoelectric transducer based on the current through the low impedance path. 16. the controller identifying, based at least in part on the quality factor or impedance, a transducer state from a set of potential states including multiple transducer fault states. 17. the multiple parameters include at least the resonant frequency and the quality factor. 18. the multiple parameters include at least the quality factor and the series resistance. 19. the controller providing a low impedance path for the piezoelectric transducer during the residual reverberation and measuring current through the low impedance path to determine the multiple parameters. 20. the controller providing a low impedance path for the piezoelectric transducer and measuring current through the low impedance path to determine a series resistance of the piezoelectric transducer. 21. the controller driving the piezoelectric transducer at a series of different frequencies and measuring the low impedance path current as a function of frequency to determine generated acoustic pressure. 22. The controller identifying, based at least in part on the generated acoustic pressure, a transducer state from a set of potential states including multiple transducer fault states. 23. the controller driving the piezoelectric transducer with a frequency chirp waveform. 24. the controller driving the piezoelectric transducer with a series of bursts having different carrier frequencies.

BRIEF DESCRIPTION OF THE DRAWINGS

In the drawings:

FIG. 9 is a flow diagram for an illustrative sensing method.

It should be understood that the drawings and corresponding detailed description do not limit the disclosure, but on the contrary, they provide the foundation for understanding all modifications, equivalents, and alternatives falling within the scope of the appended claims.

DETAILED DESCRIPTION

Figure 1:
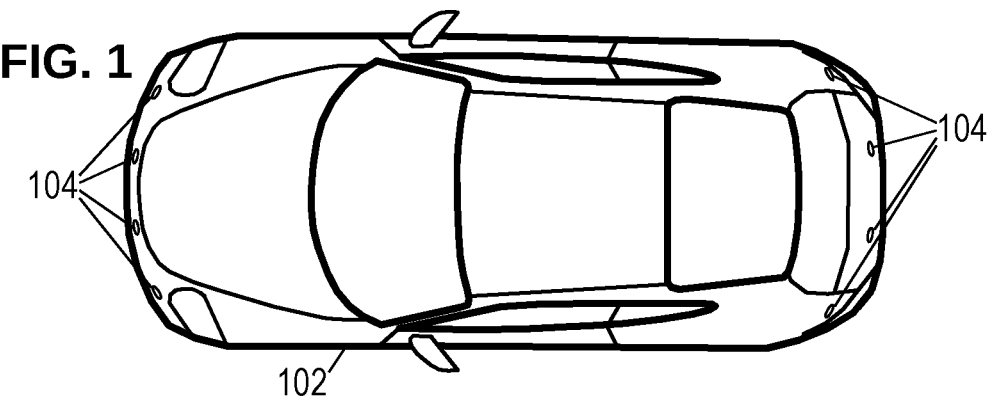
FIG. 1 is an overhead view of an illustrative vehicle equipped with parking-assist sensors.

FIG. 1 shows an illustrative vehicle 102 equipped with a set of ultrasonic parking-assist sensors 104. The number and configuration of sensors in the sensor arrangement varies, and it would not be unusual to have six sensors on each bumper with two additional sensors on each side for blind-spot detectors on each side. The vehicle may employ the sensor arrangement for detecting and measuring distances to objects in the various detection zones, using the sensors for individual measurements as well as cooperative (e.g., triangulation, multi-receiver) measurements.

The ultrasonic sensors are transceivers, meaning that each sensor can transmit and receive bursts of ultrasonic sound. Emitted bursts propagate outward from the vehicle until they encounter and reflect from an object or some other form of acoustic impedance mismatch. The reflected bursts return to the vehicle as "echoes" of the emitted bursts. The times between the emitted bursts and received echoes are indicative of the distances to the reflection points. In many systems, only one sensor transmits at a time, though all of the sensors may be configured to measure the resulting echoes. However multiple simultaneous transmissions can be supported through the use of orthogonal waveforms or transmissions to non-overlapping detection zones.

Figure 2:
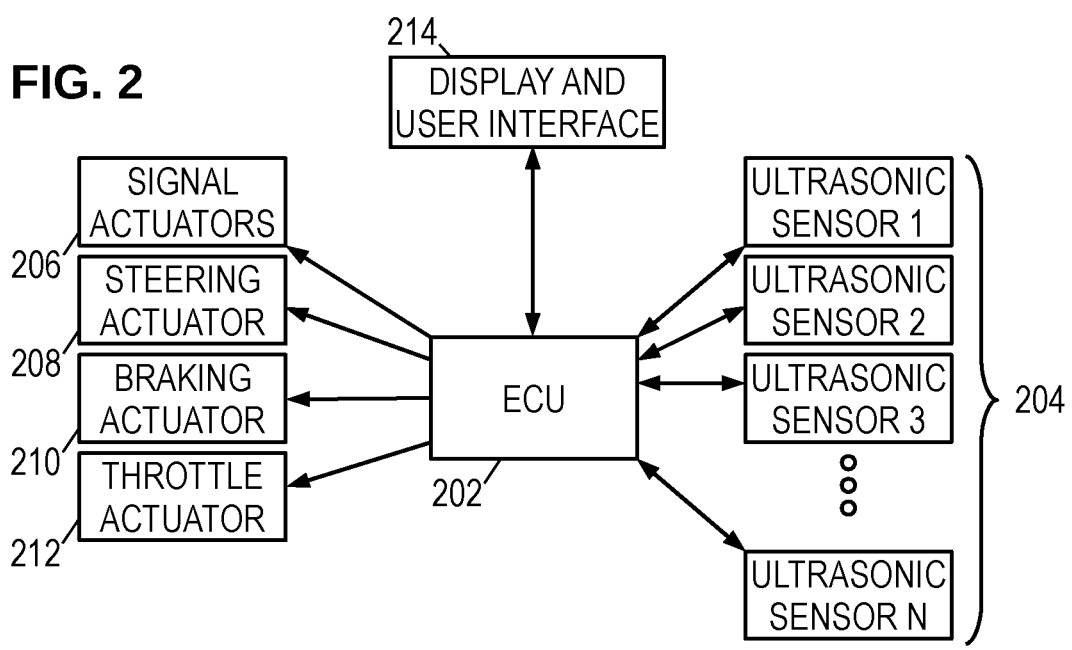
FIG. 2 is a block diagram of an illustrative parking assist system.

FIG. 2 shows an electronic control unit (ECU) 202 coupled to the various ultrasonic sensors 204 as the center of a star topology. Of course, other topologies including serial, parallel, and hierarchical (tree) topologies, are also suitable and contemplated for use in accordance with the principles disclosed herein. To provide automated parking assistance, the ECU 202 may further connect to a set of actuators such as a turn-signal actuator 206, a steering actuator 208, a braking actuator 210, and throttle actuator 212. ECU 202 may further couple to a user-interactive interface 214 to accept user input and provide a display of the various measurements and system status. Using the interface, sensors, and actuators, ECU 202 may provide automated parking, assisted parking, lane-change assistance, obstacle and blind-spot detection, and other desirable features.

One potential sensor configuration is now described with reference to FIG. 3. (Other communication and power supply techniques such as those provided in the DSI3, LIN, and CAN standards, are also suitable and contemplated for use in accordance with the principles disclosed herein.) Besides the two power terminals (Vbat and GND) shown in the embodiment of FIG. 3, each of the illustrative ultrasonic sensors is only connected to the ECU 202 by a single input/output ("I/O" or "IO") line. The sensor's ground terminal (GND) is shown as being directly connected to the ground terminal of an application-specific integrated circuit (ASIC) sensor controller 302, while the Vbat terminal is coupled through an RC filter (resistor R2 and capacitor C4) and a diode-fed (D1) storage capacitor C5 to a supply voltage (VSUP) terminal of the sensor controller 302. The RC filter blocks any high-frequency noise, while the storage capacitor C5 protects against transient power loss.

The sensor's IO terminal is coupled via a slew-rate limiting noise filter (resistors R3 and R5, with capacitor C6) to an I/O terminal of the sensor controller 302. A pull-up resistor R4 biases the I/O line to the supply voltage (the "de-asserted" state) when it is not actively driven low (the "asserted" state) by the ECU 202 or by the sensor controller 302. The communication protocol is designed to have only one of the two controllers (ECU 202 or sensor controller 302) asserting the I/O line at any given time.

The sensor controller 302 includes an I/O interface 303 that, when placed in a recessive mode, monitors the I/O line for assertion by the ECU 202 and, when placed in a dominant mode, drives the state of the I/O line. The ECU communicates a command to the sensor by asserting the I/O line, the different commands being represented by assertions of different lengths. The commands may include a "send and receive" command, a "receive only" command, and a "data mode" command.

The sensor controller 302 includes a core logic 304 that operates in accordance with firmware and parameters stored in nonvolatile memory 305 to parse commands from the ECU and carry out the appropriate operations, including the transmission and reception of ultrasonic bursts. To transmit an ultrasonic burst, the core logic 304 is coupled to a transmitter 306 which drives a set of transmit terminals on the sensor controller 302. The transmitter terminals are coupled via a transformer M1 to a piezoelectric element PZ. The transformer M1 steps up the voltage from the sensor controller (e.g., 12 volts) to a suitable level for driving the piezoelectric element (e.g., tens of volts). The piezoelectric element PZ has a resonance frequency that is tuned to a desirable value (e.g., 48 kHz) with a parallel capacitor C3, and has a resonance quality factor (Q) that is tuned with a parallel resistor R1. One illustrative purpose of the tuning capacitor and tuning resistor is to tune the parallel resonance frequency close to the series resonant frequency of the piezoelectric element.

As used herein, the term "piezoelectric transducer" includes not only the piezoelectric element, but also the supporting circuit elements for driving, tuning, and receiving from, the piezoelectric element. In the illustrative embodiment, these supporting elements are the transformer M1, the tuning resistor and tuning capacitor, and the DC-isolation capacitors. Optionally, output and input capacitance of the transmitter 306 and amplifier 308, respectively, may also be included as parasitic characteristics of the supporting circuit elements considered to be part of the transducer. However, the use of the term "piezoelectric transducer" does not necessarily require the presence of any supporting circuit elements, as a piezoelectric element may be employed alone without such supporting elements.

A pair of DC-isolation capacitors C1, C2 couple the piezoelectric element to the sensor controller's pair of receive terminals to protect against high voltages. Further protection is provided with internal voltage clamps on the receive terminals. Such protection may be desired for the intervals when the piezoelectric element is transmitting. As the received echo signals are typically in the millivolt or microvolt range, a low-noise amplifier 308 amplifies the signal from the receive terminals. The amplified receive signal is digitized and processed by a digital signal processor (DSP) 310 with an integrated analog-to-digital converter (ADC).

DSP 310 applies programmable methods to measure the actuation period of the piezoelectric transducer during the transmission of a burst (including the ensuing reverberation or "ringing" period), and to detect and measure the lengths of any received bursts or "echoes". Such methods may employ threshold comparisons, minimum intervals, peak detections, zero-crossing detection and counting, noise level determinations, and other customizable techniques tailored for improving reliability and accuracy. The DSP 310 may further process the amplified receive signal to analyze characteristics of the transducer, such as resonance frequency and quality factor, and may further detect transducer fault states as provided in detail below. Some fault states may be indicated by, e.g., an excessively short actuation period (which may be due to a disconnected or defective transducer, suppressed vibration, or the like), while others may be indicated by an excessively long actuation period (defective mounting, inadequate damping resistance, or the like).

Commands received via the I/O line trigger the core logic 304 to operate the transmitter and receiver and provide the measurement results to the ECU 202 via the I/O line, as explained further below. In addition to the transducer fault states that may be detected by the DSP 310, the core logic may monitor other sensor error conditions such as having the supply voltage "under-voltage" or "over-voltage" while transmitting an ultrasonic burst, thermal shutdown of transmitter, a hardware error, an incomplete power-on reset, or the like. The core logic 304 may detect and classify multiple such transducer fault states and error conditions, storing the appropriate fault codes in internal registers or nonvolatile memory 305.

Figure 4:
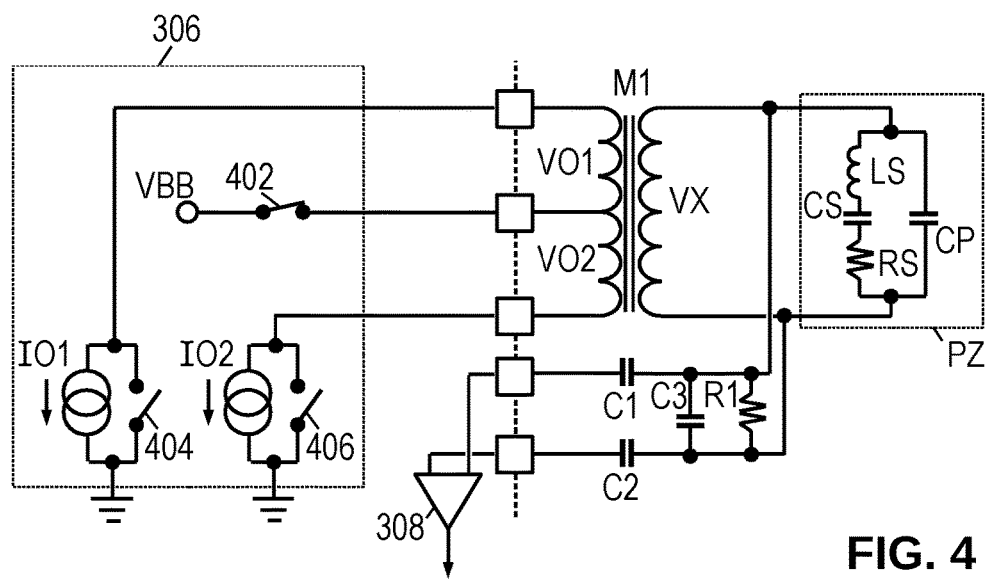
FIG. 4 is an equivalent circuit schematic with added transmitter detail.

FIG. 4 is a circuit schematic in which the piezoelectric element PZ is replaced by an equivalent circuit representation of a parallel capacitor CP coupled in parallel with a series combination of a series inductor LS, a series capacitor CS, and a series resistor RS. The series combination represents mechanical action of the piezoelectric element, with RS representing the element's energy loss (which during normal operation is primarily due to the radiated acoustic energy). FIG. 4 also provides additional detail for an illustrative implementation of transmitter 306.

During the driving stage of transmitting an acoustic burst, switch 402 is closed, coupling a supply voltage VBB to a center tap on the primary of transformer M1. Current sources I01 and I02 alternately drive current in opposite directions from the center tap to the end taps on the primary of transformer M1, producing an alternating voltage VX on the secondary of transformer M1. The secondary voltage VX is coupled to the terminals of piezoelectric element PZ. Note that the turn ratio of the transform M1 makes the alternating secondary voltage VX directly proportional to the sum of primary winding voltages VO1 and VO2. Consequently, the voltage between the terminals of the piezoelectric element can be determined by measuring the voltages on primary windings, though in the discussion below the measurement is described as being made across the secondary winding.

When the driving stage of transmitting an acoustic burst is complete, switch 402 is opened. The piezoelectric transducer will continue to reverberate after the driving stage, with a gradual decay of the reverberation amplitude. It is often desired to minimize the length of this reverberation stage, and accordingly a number of damping techniques may be employed as described in the public literature. In the illustrated implementation, switches 404 and 406 are closed, effectively "shorting" the transducer by creating a low-impedance path between the taps of the transformer primary. (As used herein, the term "low impedance" path is intended to mean a path with sufficiently low impedance to render the effect of the parallel capacitance CP and C3, negligible. Thus it should be as low as possible while still enabling a current measurement to be acquired; preferably no more than about 100 ohms.) Alternatively, a switch on the secondary side of the transformer could close to create a low impedance path between the terminals of the piezoelectric element. In at least some of the illustrative sensor embodiments described herein, the current through the low impedance path is measured, which may be easier to implement on the primary side of the transformer. A current mirror and/or a sense resistor may be employed to measure the low impedance path current during the reverberation stage of acoustic burst transmission.

Figure 5:
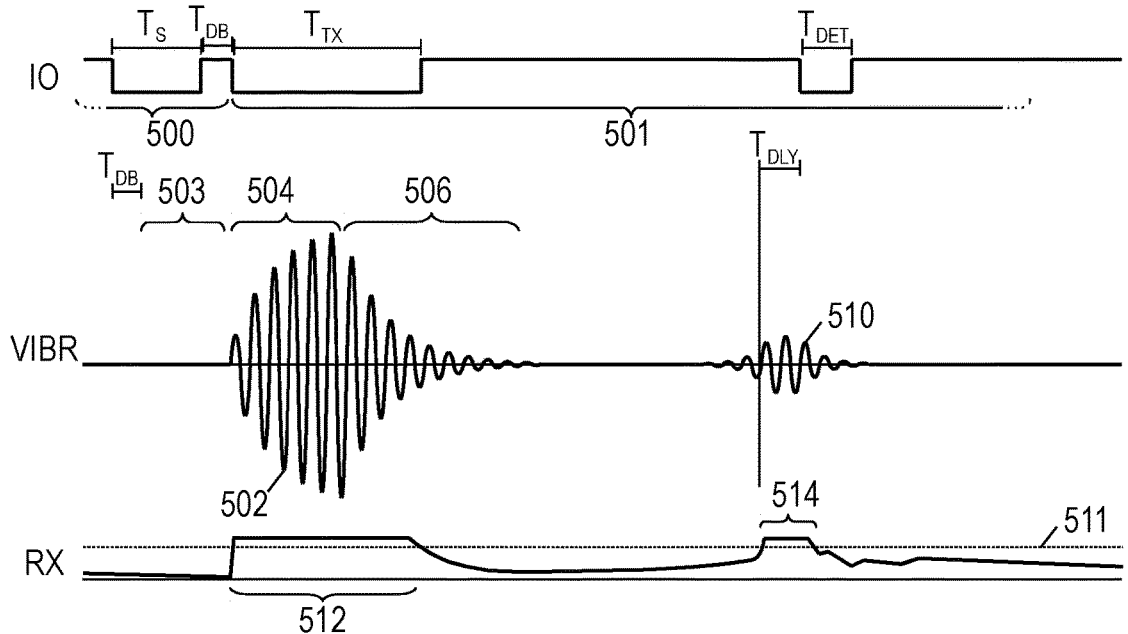
FIG. 5 is a graph relating controller input and output signals.

Turn now to FIG. 5, which illustrates some relative timing of various signals to aid in understanding the operation of the illustrative sensor embodiments, particularly with regard to communication on the I/O line. An ECU formulates a signal pulse "CMD" having a duration that represents a desired command, in this instance "$T_S$" to represent a "send and receive" command. (Illustrative command pulse durations may be in the 300-1300 microsecond range.) During a time 500 when the sensor is inactive (i.e., not performing a measurement or otherwise responding to a command from the ECU), the I/O line is high (de-asserted). During this time 500, the ECU is allowed to control the I/O line. The ECU asserts the IO signal by actively driving the line low for the duration representing the command. There is a small propagation delay due to limited slew rates on the I/O line, and a debounce interval ("$T_{DB}$") follows the assertion and de-assertion to ensure that the timing of line's return to battery voltage is deliberate and not a result of transient noise. (Illustrative debounce intervals may be in the 40-80 microsecond range.)

With the lapse of the debounce interval, the sensor controller decodes the command and takes control of the I/O line for a predetermined interval 501 that may depend on the command. For a "send and receive" command, the sensor controller begins the predetermined interval 501 with the transmission of an acoustic burst 502 and retains control until a programmed measurement interval has elapsed. Before discussing the operation of the I/O line during this measurement interval 501, we consider the operation of the piezoelectric transducer and the corresponding amplified receive signal RX.

The operation of the piezoelectric transducer is here represented as a vibration signal VIBR representing mechanical oscillation of the piezoelectric element. (Note that the signal is not shown to scale, as the transmitted burst 502 may be orders of magnitude larger than the echo 510.) Electrically, the mechanical vibration of the piezoelectric element can be detected as a voltage (which is suitable when employing a drive current to generate the acoustic burst) or a current (which is suitable when employing a drive voltage to generate the acoustic burst). Similarly, a voltage measurement may be suitable when opening the circuit in preparation for damping vibration, as a current measurement may be suitable when momentarily closing the circuit before damping the vibration. Damping may then proceed with the introduction of an energy dissipation resistance (e.g., R1) between the terminals of the element. Other driving and damping methods may support the use of either voltage measurement, current measurement, or both, to detect the vibration.

Figure 3:
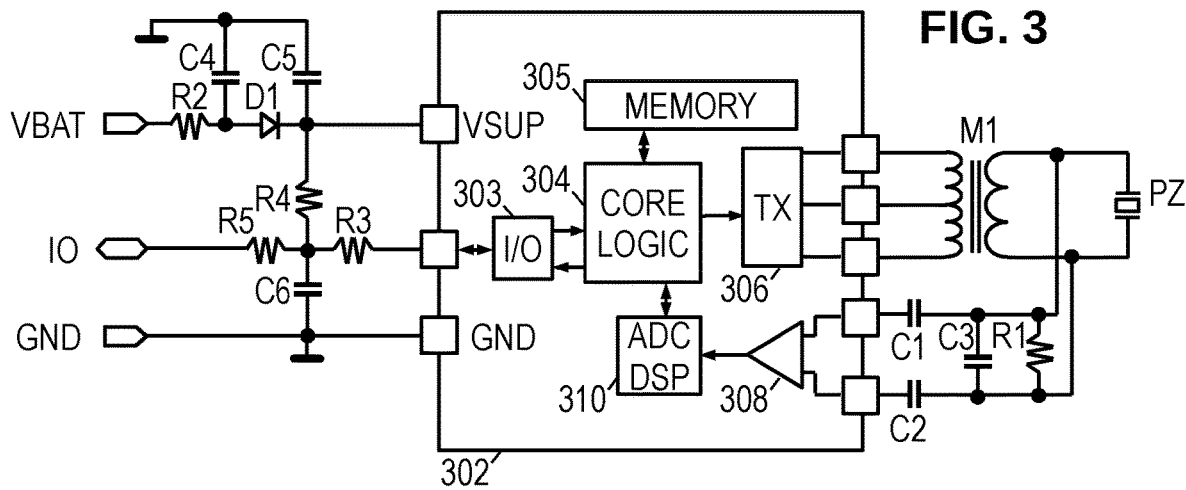
FIG. 3 is a circuit schematic of an illustrative parking-assist sensor.

In the sensor embodiment of FIGS. 3-4, the vibration is detected as a clamped, amplified version of the secondary voltage VX via amplifier 308. For explanatory purposes the RX signal illustrated in FIG. 5 is an envelope of this clamped, amplified voltage signal, but the amplified oscillatory signal can also be employed.

The sensor controller measures a noise level during a pre-transmit period 503, which may begin one debounce interval after the ECU asserts the I/O line and may end when the transmit burst is sent. The actuation of the transducer for the transmit burst causes the RX signal to saturate. (In at least some implementations, internal voltage clamps on the receive terminals of the sensor controller prevent excessive voltages from reaching amplifier 308). The transmit burst overwhelms the receiver and prevents any meaningful echo measurements from being acquired during this interval. While the receive signal is above a threshold 511 (and/or compliant with other implementation-specific requirements that aren't relevant here), the sensor controller drives the I/O line low. Thus, the controller asserts the IO signal during the actuation interval $T_{TX}$, which corresponds to the interval 512 where the RX signal exceeds the threshold 511. This assertion during the transmit burst enables the ECU to measure the actuation interval ("$T_{TX}$") of the transducer, enabling it to verify operation of the transducer.

Note that the actuation interval includes not only the drive stage 504 of the acoustic burst generation, but also a portion of the reverberation stage 506 of the acoustic burst. The time required for the reverberation amplitude to drop below threshold 511 is indicative of the losses in the transducer, and accordingly may be used as an indicator of the quality factor (Q). The actuation interval may be used directly, may be converted into a decay rate (potentially expressed in the form of an attenuation factor or a value for the series resistor RS in the equivalent circuit representation of the piezoelectric element), or may be combined with a resonant frequency measurement to derive a measured value for the quality factor (Q).

Once the receive signal falls below a threshold 511, it becomes possible to detect echoes, and the I/O line is de-asserted until such time as the sensor controller detects a valid echo. The requirements for a valid echo may include, e.g., a minimum time ("$T_{DLY}$") above a threshold 511, the minimum time being equal to or greater than the debounce interval $T_{DB}$. Such a requirement necessarily requires that the assertion of the I/O line in response to an echo be delayed by the minimum time $T_{DLY}$. The assertion lasts for a duration ("$T_{DET}$") equal to the detected length 514 of the echo burst. In at least some embodiments, multiple echoes may be detected and represented by respective assertions of the I/O line. At the end of the programmed measurement interval 501, the sensor controller 302 releases control of the I/O line.

With the foregoing protocol, it is possible for the ECU to detect certain sensor error conditions during measurements, but not other measurement conditions. Errors such as excessive noise, under/over-voltage conditions, and the like, can only be detected if the ECU halts the measurement sequence and takes the time to send a "data" command to probe the appropriate registers of the sensor controller. Without such probing, the ECU may inadvertently rely on unreliable measurements, yet with such probing the measurement repetition rate may become inadequate. In commonly-owned U.S. application Ser. No. 14/853,307 titled "Triggered-event signaling with digital error reporting" and filed 2015 Sep. 14, which is hereby incorporated herein by reference, the sensor controller embeds digital bits near the beginning of the actuation interval to report error conditions to the ECU. These bits may also or alternatively be employed by the sensor controller to communicate identified transducer states to the ECU. In any event, it is expected that the sensor controller will employ internal registers to store codes representing the transducer state and any detected error conditions, and that the ECU can employ a data command to retrieve this information via the I/O line.

Figure 6:
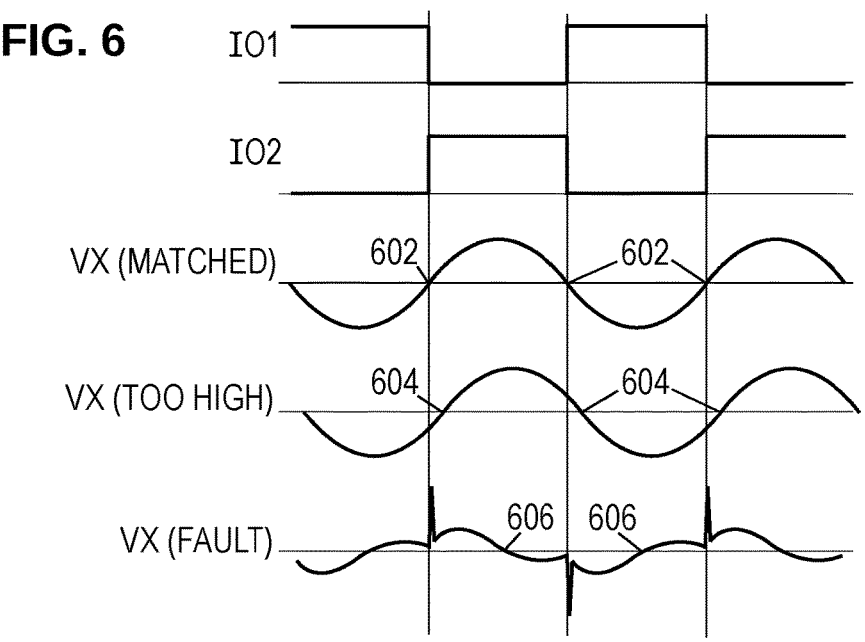
FIG. 6 is a graph relating supply current and voltage phases.

In addition to monitoring the actuation interval, decay rate, and/or quality factor (Q), the sensor controller may monitor other characteristics of the transducer's response to a transmit burst to determine the transducer state. FIG. 6 shows the alternating operation of current sources IO1 and IO2 (from FIG. 4) during the driving stage of acoustic burst transmission. When the alternation frequency of the current sources is matched to the resonant frequency of the transducer, the transducer voltage VX will be in phase with the drive current. Thus the zero crossings 602 of voltage signal VX will be closely aligned with the transitions in the drive current. However, if the frequency of the drive current does not match the transducer's resonant frequency, the supply current and voltage will be out of phase. For example, if the frequency of the drive current is too high, the zero crossings 604 of the voltage signal will lag behind the transitions in the drive current. Conversely, if the drive current frequency is below the transducer's resonant frequency, the zero crossings would lead the transitions in the drive current.

Thus, the sensor controller can monitor the zero crossings to determine the phase of the voltage signal, and can compare the voltage signal phase to the phase of the drive current during the driving stage of acoustic burst generation to calculate, or adaptively determine, the transducer's resonant frequency. This technique is also applicable for detecting a transducer fault state. For example, FIG. 6 shows a voltage signal response that is expected if the piezoelectric element has become disconnected from the sensor controller. The loss of the equivalent circuit's parallel capacitance CP causes a substantial increase in the resonant frequency of the supporting circuitry for the transducer, yielding a substantial phase mismatch. The zero crossings 606 of the voltage signal VX are approximately 90° out of phase with the drive current.

While phase-comparison of the supply voltage and current provides one technique for determining the transducer's resonant frequency, other techniques can alternatively be employed. For example, FIGS. 7A-7E show the frequency dependence of the transducer's response magnitude and phase. While this dependence can be measured in various ways, at least some contemplated embodiments measure the response current while a voltage chirp is applied (or a response voltage while a current chirp is applied). The chirp waveform provides an instantaneous frequency that increases or decreases as a function of time (e.g., linear frequency ramp), enabling the dependence of the response magnitude and phase to be measured as a function of time and mapped to the instantaneous frequency.

In each of the graphs, the transducer's nominal resonance frequency F0 is shown. As previously discussed, the actual resonance frequency may vary from the nominal value due to temperature effects and/or the operating state of the transducer. The response magnitude is shown as a solid line, measured as an amplitude relative to the x-axis which represents zero response (the amplitude scale is arbitrary and accordingly omitted). The response phase is shown as a broken line, measured relative to the zero-degree tick mark on the y-axis.

Figure 7A:
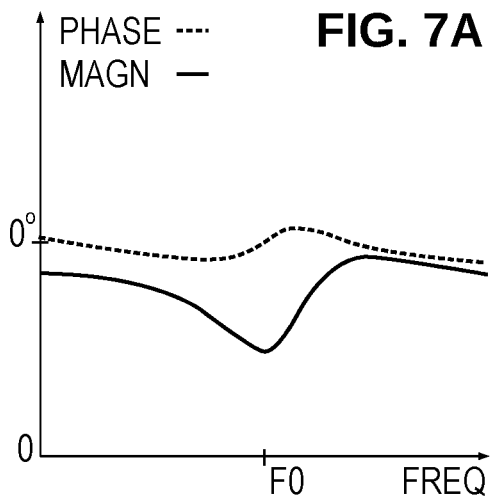
FIGS. 7A-7E are frequency spectra of response phase and magnitude for different transducer states.

FIG. 7A shows a frequency dependence typical of a transducer operating in a normal state. A valley in the magnitude response reaches its minimum at the transducer's resonant frequency, and the phase response crosses zero at the transducer's resonant frequency. The width of the valley is indicative of the transducer's quality factor Q, which is primarily determined by (and inversely proportional to) acoustic radiation losses (represented by the value of the serial resistor in the equivalent circuit for the piezoelectric element). The quality factor Q can be expressed as the ratio of resonance frequency to the width of the valley, such that a narrower resonance valley corresponds to a higher quality factor and smaller attenuation of the residual resonance energy.

Figure 7B:
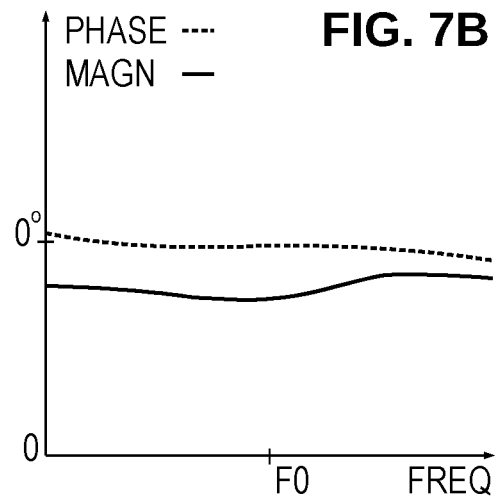

FIG. 7B shows a frequency dependence indicative of a transducer where the membrane is covered by dried mud. The transducer's resonance, while still present at a slightly reduced frequency, is greatly impeded. The "valley" is very wide and shallow, indicating a substantially reduced quality factor Q and greater damping of the oscillation. While the transducer is unable to operate well in this impeded state, the problem can be corrected by the operator removing the impairment, e.g., by washing the car.

Figure 7C:
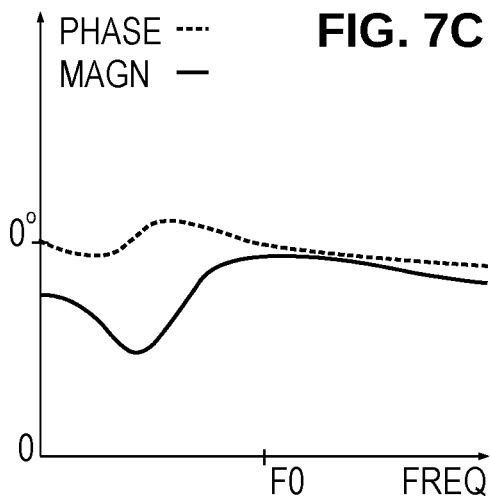

FIG. 7C shows a frequency dependence indicative of a transducer where the membrane is wet. The water layer or droplets load the membrane, changing the inertial properties of the transducer and thereby reducing the resonance frequency by a significant amount. Though shifted, the transducer's resonance is still well defined with only a slightly-reduced quality factor. As long as the sensor controller suitably adjusts the frequency of the driving waveform to match the reduced resonance frequency, the transducer can still operate satisfactorily in this loaded state.

Figure 7D:
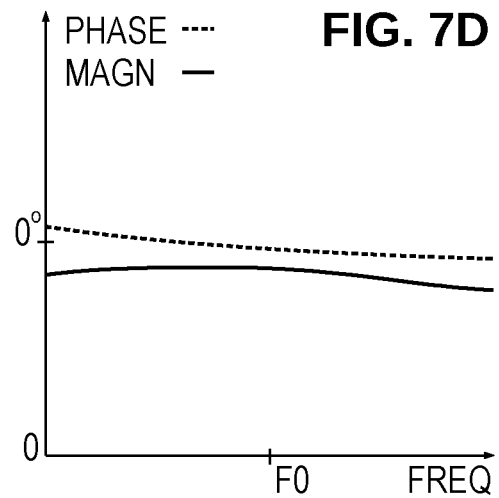

FIG. 7D shows a frequency dependence indicative of a transducer where a finger is placed on the membrane to impede vibration. In this impeded state, the operation of the transducer is similar to that of FIG. 7B, albeit with the resonance peak being erased or shifted entirely out of the transducer's operating range. The transducer's inability to acquire reliable measurements can thus be discerned and the operator instructed to remove the obstruction.

Figure 7E:
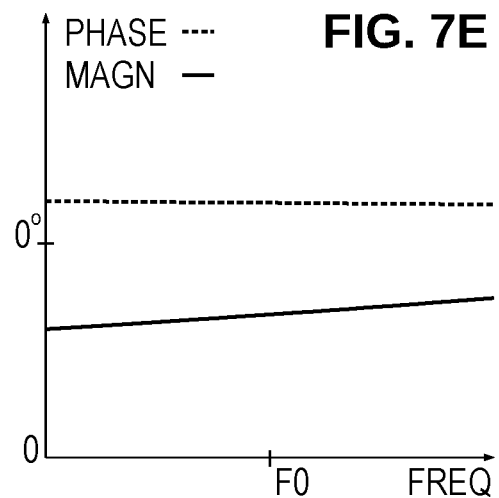

FIG. 7E shows a frequency dependence indicative of a transducer having a disconnected piezoelectric element, which could be attributable to a broken wire. In this defective state, the response phase is about 90 degrees out of phase (throughout the operating range) and the response magnitude is significantly reduced and linearly dependent on frequency.

As another example of how a transducer state can be diagnosed from response measurements, FIGS. 8A-8D show measurements of response frequency (broken line) and magnitude (solid line) to a rectangular burst of a fixed-frequency sinusoidal carrier signal. The x-axis represents a non-zero cutoff threshold that is applied to the magnitude measurement, and a tick mark on the y-axis indicates the nominal resonance frequency of the transducer. The illustrated frequency measurements are based on zero-crossing measurements of the response signal, while the illustrated magnitude measurements are rectified and filtered response voltage measurements.

Figure 8A:
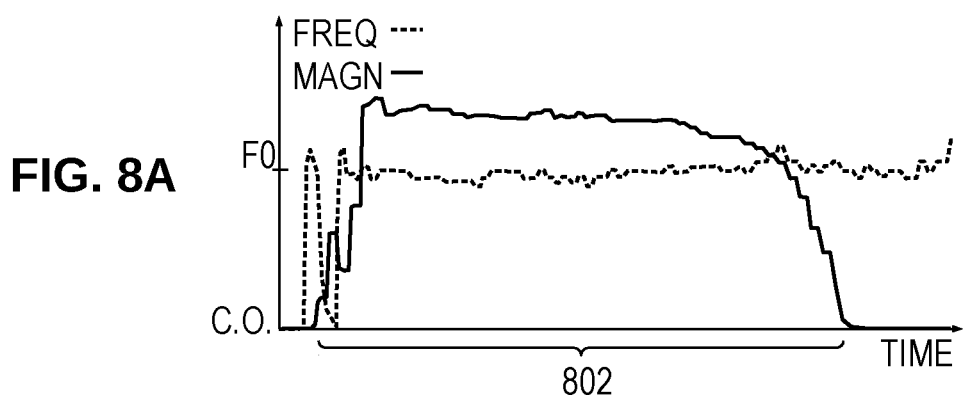
FIGS. 8A-8D are graphs of response frequency and magnitude as a function of time.

FIG. 8A shows an illustrative time dependence of frequency and magnitude measurements by the sensor controller. The illustrative time dependence in FIG. 8A is indicative of a transducer operating in a normal state. Once the vibration of the piezoelectric element converges during the driving burst, the frequency measurement stabilizes and is approximately equal to the nominal resonance frequency of the transducer. The estimated frequency remains stable during the reverberation stage of the transmission burst (and its accuracy even improves until the reverberation magnitude falls off). The duration of the actuation interval 802 is measured and used as a standard for later comparisons.

Figure 8B:
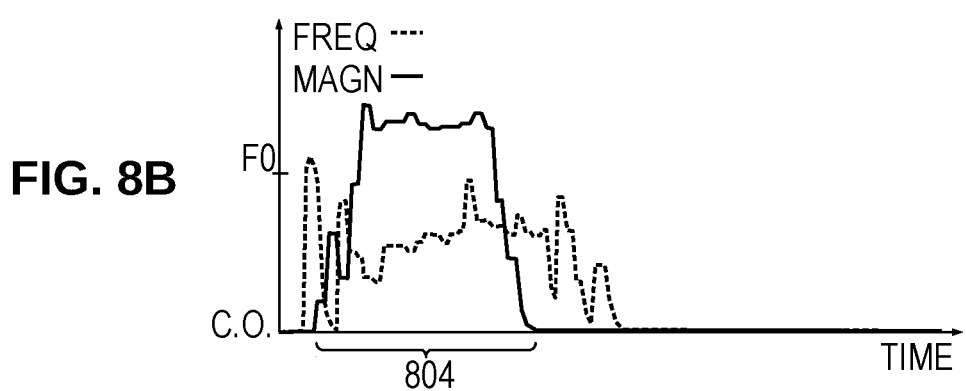

FIG. 8B shows an illustrative time dependence of the frequency and magnitude measurements for a transducer operating in an impeded state (e.g., with mud coating the membrane). The frequency estimate exhibits a wide variation due to the poor resonance characteristics of the transducer, and the increased damping substantially reduces the actuation interval 804 relative to the standard interval.

Figure 8C:
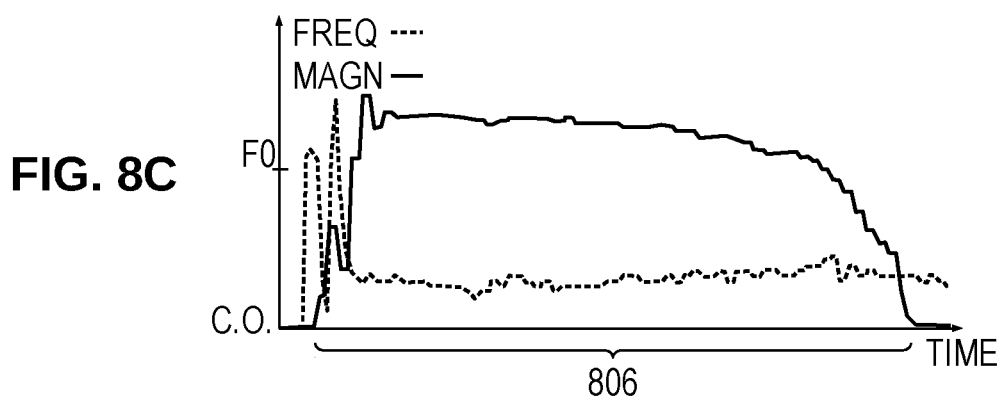

FIG. 8C shows an illustrative time dependence of the frequency and magnitude measurements for a transducer operating in a loaded state (e.g., with water droplets on the membrane). The frequency stabilizes at a significantly reduced value due to the shifted resonance frequency of the transducer, and the actuation interval 806 is slightly increased.

Figure 8D:
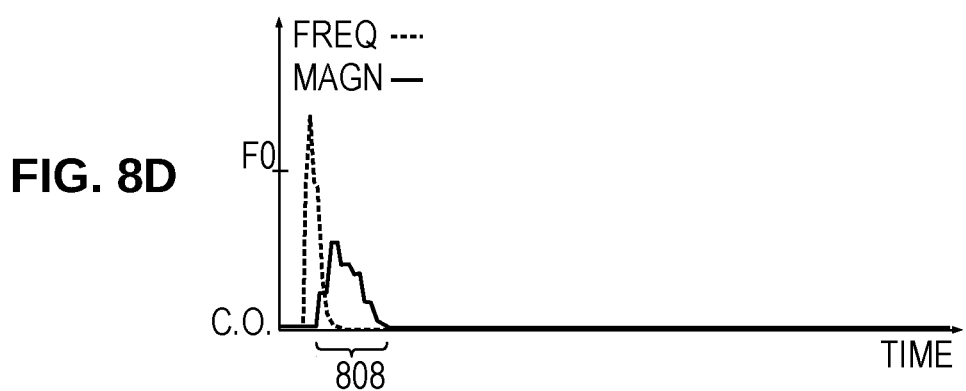

FIG. 8D shows an illustrative time dependence of the frequency and magnitude measurements for a transducer operating in a defective state (e.g., with a disconnected piezoelectric element). Essentially no reverberation appears, with the measured frequency dropping rapidly and the actuation interval 808 becoming negligible.

Another parameter measurement approach (which may be used in place of, or together with, the previous approaches), is to apply a series of bursts at different frequencies and measure the transducer's response to each burst. In some cases the response may be measured as the peak current flow through a low impedance path provided during the residual reverberation after each burst. The peak current is proportional to the series resistance and hence may be taken as a measure of acoustic pressure at the carrier frequency for that burst. The frequency dependence (i.e., notch width) of the acoustic pressure may be used as a proxy for the quality factor Q.

In view of the foregoing principles and context, a variety of state detection and fault diagnosis methods can now be understood. As a first example, the sensor controller drives the piezoelectric transducer to produce an ultrasonic signal, using one or more current sources to provide a burst of amplitude modulated pulses. While driving the transducer with a drive current, the sensor controller senses the transducer voltage VX, and determines the phase shift between the drive current and the transducer voltage. Based on the phase shift, the sensor controller may determine whether the drive current frequency is above or below the resonant frequency of the transducer, and may iteratively or directly calculate the transducer's resonant frequency. After the burst of current pulses is complete, the sensor controller may further monitor the shape of the reverberation envelope to determine the attenuation rate, time constant, damping factor, series resistance RS, or similar measure of energy loss, and optionally derive a quality factor by combining this measure with the transducer's resonant frequency. As previously explained, each transducer state is expected to have a distinctive value of one or more of these parameters, enabling the sensor controller to determine the transducer state (e.g., normal, loaded, impeded, defective) based on the measured parameter values.

As a second example, the sensor controller drives the piezoelectric transducer to produce an ultrasonic burst, using either an alternating voltage or current source. Once the driving stage is complete, the sensor controller shorts circuits the piezoelectric transducer and measures the current through the low impedance path. As the low impedance path minimizes the effect of the parallel capacitor CP and C3 (in the equivalent circuit of FIG. 4), the low impedance path current is attributable to the residual resonance in the resonant tank created by the series inductor LS, series capacitor CS, and series resistor RS. The sensor controller monitors the current waveform to measure the resonance frequency, and the waveform's envelope to determine the attenuation rate, time constant, damping factor, series resistance, or similar measure of energy loss, and optionally derive a quality factor by combining this measure with the transducer's resonant frequency. We note here that this measure of resonant frequency successfully isolates the contribution of the series resonance from the potentially interfering parallel resonance (with parallel capacitor CP), significantly improving the accuracy of this resonant frequency measurement. Each transducer state is expected to have a distinctive value of one or more of these parameters, enabling the sensor controller to determine the transducer state (e.g., normal, loaded, impeded, defective) based on the measured parameter values.

As a third example, the sensor controller drives the piezoelectric transducer with a frequency-chirping voltage or current source, measuring the complementary current or voltage response. The frequency dependence of the phase shift between voltage and current reaches zero at the resonance frequency, enabling the sensor controller to identify the resonant frequency based on the phase shift. The magnitude of the response at the resonant frequency (when placed in a ratio with the driving voltage or current magnitude) corresponds to the value of the series resistor RS (in the equivalent circuit of FIG. 4). This series resistance is directly related to other measures of energy loss including attenuation rate, time constant, and damping factor, and may be combined with the resonant frequency measurement to calculate a resonance quality factor Q. Each transducer state is expected to have a distinctive value of one or more of these parameters, enabling the sensor controller to determine the transducer state (e.g., normal, loaded, impeded, defective) based on the measured parameter values.

As a fourth example, the sensor controller drives the piezoelectric transducer with a burst from a fixed-frequency sinusoidal carrier voltage or current source, measuring the complementary current or voltage response. The sensor controller may adapt the drive frequency to at least approximately match the resonant frequency of the transducer. The magnitude of the response near the resonant frequency (when placed in a ratio with the driving voltage or current magnitude) corresponds to the value of the series resistor RS (in the equivalent circuit of FIG. 4), and thus the response magnitude at the end of the drive burst may be taken as being a measure of energy loss directly related to other measures such as attenuation rate, time constant, and damping factor, and may be combined with the resonant frequency measurement to estimate a resonance quality factor Q. Each transducer state is expected to have a distinctive value of this response magnitude parameter, whether taken alone or in combination with the resonance frequency, enabling the sensor controller to determine the transducer state (e.g., normal, loaded, impeded, defective) based on the measured parameter values.

As a fifth example, the sensor controller drives the piezoelectric transducer with a frequency-chirping voltage or current source, measuring the complementary current or voltage response. The frequency dependence of the magnitude reaches a minimum at the resonance frequency, and has a valley width that directly relates the series resistance, attenuation rate, time constant, and damping factor, and which can be combine with the resonance frequency to determine a quality factor Q. These parameters, or the shape of the magnitude's frequency dependence itself (i.e., the spectrum of the response) can be used by the sensor controller to determine the transducer state (e.g., normal, loaded, impeded, defective) based on the measured parameter values.

FIG. 9 is a flow diagram for an illustrative sensor control method. It begins in block 902 with the control logic initializing (and thereafter, updating) registers used to store codes representing the transducer state and any detected errors. These registers are reset when read by the ECU. In block 904, the control logic determines whether the ECU has asserted the I/O line to initiate a command. (As previously noted, other communication and power supply techniques are also suitable and contemplated for use.) If not, blocks 902 and 904 are repeated while the control logic awaits a command.

Upon detecting the initiation of a command, the control logic prompts the receiver to perform noise level detection in block 906. In block 908, the control logic determines if the command has been fully received. If not, block 904 and 906 are repeated while the control logic awaits completion of the command.

Once the command has been fully received, the control logic determines in block 910 whether it is a "data" command. If so, the control logic 912 parses the digital command code to determine what the command is and carries it out. For example, the command may indicate that a certain value is to be written to a specified memory address, or that the contents of a specified register are to be sent to the ECU. The control logic carries out the command and signals its completion to the ECU. Once the data operations have been completed, the control logic returns to block 902.

If the command is not a data command, the control logic determines in block 914 if it is a "receive only" command. If so, the DSP performs echo detection in block 916 (driving the I/O line as described previously) and, once the measurement period elapses, the sensor controller relinquished control of the I/O line and returns to block 902.

If in block 914 the command is determined to be (rather than a receive-only command) a send & receive command, the control logic triggers the transmitter to send a transmit burst in block 918, taking control of the I/O line as described previously. As described in the related application, the control logic may, upon taking control of the I/O line, send a digital status word (consisting of one or more bit intervals) to the ECU. The digital status word may be derived from the codes stored in the internal registers.

In block 920, the DSP measures the piezoelectric transducer response during the driving stage and/or during the reverberation stage of the acoustic burst transmission, deriving one or more response parameters such as resonance frequency, quality factor, magnitude, phase shift, actuation interval, attenuation rate, series resistance, damping factor, etc. As described previously, the digital status word is derived from a noise level measurement and any error conditions that may be stored in the hardware registers. (In certain alternative embodiments, the response measurement and parameter determination may be decoupled from the echo-measurement operation of the sensor, such that most echo measurements are performed without measuring the response parameters. The response parameters may then be determined using the disclosed principles when needed via a dedicated command or calibration operation independent of the echo measurement process.)

In block 922, the DSP optionally adapts the driving frequency, amplitude, and/or waveform to optimize the efficiency of acoustic burst transmission. In block 924, the DSP analyzes the measured parameter(s) to detect whether they indicate that a new fault or change of transducer state has occurred. If not, the DSP performs echo detection in block 916 and drives the I/O line accordingly. Otherwise, before performing echo detection in block 916, the DSP in block 926 analyzes the measured parameters to classify any faults and identify the transducer state (e.g., normal, loaded, impeded, or defective). The status code for any such diagnosed faults or state conditions will be stored in internal registers in block 902, and may be communicated to the ECU, which in turn may alert the operator of the vehicle using a dashboard indicator or alert tone. Preferably, the operator is informed of the transducer state and provided with guidance as to whether increased caution is sufficient, whether sensor impairments should be removed, or whether a trip to a repair shop is recommended.

Though the operations shown and described in FIG. 9 are treated as being sequential for explanatory purposes, in practice the method may be carried out by multiple integrated circuit components operating concurrently and perhaps even speculatively to enable out-of-order operations. The sequential discussion is not meant to be limiting. Moreover, the foregoing embodiments may omit complicating factors such as parasitic impedances, current-limiting resistors, level-shifters, line clamps, etc., which may be present but do not meaningfully impact the operation of the disclosed circuits. Still further, the focus of the foregoing discussions has been ultrasonic sensors, but the principles are applicable to any sensors with operating parameters that may be impaired or affected by transducer loading. These and numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A sensor that comprises:
   a piezoelectric transducer; and
   a controller that drives the piezoelectric transducer to generate bursts of acoustic energy and, based on a response of the piezoelectric transducer to said driving, identifies a corresponding transducer state from a set of potential states including multiple types of transducer fault states, the identification of any such transducer fault state indicating the type of said transducer fault state,
   wherein as part of identifying a corresponding transducer state, the controller derives a quality factor (Q) from the response, and
   wherein the controller measures the quality factor during a driving stage of the response.

2. The sensor of claim 1, wherein the multiple types of transducer fault states include: loaded, impeded, and defective.

3. The sensor of claim 1, wherein as part of identifying a corresponding transducer state, the controller derives a resonant frequency from the response.

4. The sensor of claim 3, wherein the controller measures the resonant frequency during a reverberation stage of the response.

5. The sensor of claim 4, wherein the controller shorts the piezoelectric transducer while measuring the resonant frequency.

6. The sensor of claim 3, wherein the controller measures the resonant frequency during the driving stage of the response by comparing phases of current and voltage supplied to the piezoelectric transducer.

7. The sensor of claim 1, wherein the controller measures the quality factor during the driving stage of the response by measuring the frequency dependence of the response.

8. The sensor of claim 1, wherein as part of identifying a corresponding transducer state, the controller derives at least two parameters of the piezoelectric transducer from the response.

9. A method of operating a piezoelectric-based sensor, the method comprising:
- driving a piezoelectric transducer to generate a burst of acoustic energy;
- monitoring a response of the piezoelectric transducer to said driving;
- identifying, based on said response, a corresponding transducer state from a set of potential states including multiple types of transducer fault states, said identifying of any such transducer fault state indicating the type of said transducer fault state; and
- if the transducer state is a fault state, reporting the type of that fault state, wherein said identifying includes deriving a quality factor (Q) from the response and said deriving includes measuring the quality factor during a driving stage of the response.

10. The method of claim 9, wherein the multiple types of transducer fault states include: loaded, impeded, and defective.

11. The method of claim 9, wherein said identifying includes deriving a resonant frequency from the response.

12. The method of claim 11, wherein said deriving includes measuring the resonant frequency during a reverberation stage of the response.

13. The method of claim 12, wherein said deriving includes shorting the piezoelectric transducer while measuring the resonant frequency.

14. The method of claim 11, wherein said deriving a resonant frequency occurs during the driving stage of the response and includes comparing phases of current and voltage supplied to the piezoelectric transducer.

15. The method of claim 9, wherein said measuring the quality factor includes determining the frequency dependence of the response.

16. The method of claim 9, wherein said identifying includes deriving at least two parameters of the piezoelectric transducer from the response.

17. A controller for a piezoelectric transducer, the controller comprising:
- a transmitter to drive a piezoelectric transducer to generate bursts of acoustic energy;
- a receiver to sense a response of the piezoelectric transducer to said driving; and
- a core logic circuit coupled to the transmitter and to the receiver, the core logic circuit operable to identify, based on said response, a transducer state from a set of potential states including multiple types of transducer fault states, said identification of any such transducer fault state indicating the type of said transducer fault state,
- wherein as part of identifying a corresponding transducer state, the core logic circuit measures a quality factor (Q) during a driving stage of the response.

18. The controller of claim 17, wherein the receiver senses the response while the transmitter drives the piezoelectric transducer with a carrier signal pulse.

19. The controller of claim 17, wherein the receiver senses the response during a reverberation period of the piezoelectric transducer after the transmitter completes a carrier signal pulse.

20. The controller of claim 17, wherein the receiver senses the response while the transmitter drives the piezoelectric transducer with a chirp signal.

* * * * *